United States Patent
Jujare et al.

(10) Patent No.: US 9,015,650 B2
(45) Date of Patent: Apr. 21, 2015

(54) UNIFIED DATACENTER STORAGE MODEL

(71) Applicant: Microsoft Corporation, Redmond, WA (US)

(72) Inventors: Madhusudhan R. Jujare, Santa Clara, CA (US); Hector Antonio Linares, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 13/921,106

(22) Filed: Jun. 18, 2013

(65) Prior Publication Data

US 2014/0359556 A1    Dec. 4, 2014

Related U.S. Application Data

(60) Provisional application No. 61/830,526, filed on Jun. 3, 2013.

(51) Int. Cl.
G06F 9/44    (2006.01)

(52) U.S. Cl.
CPC ........................................ *G06F 8/20* (2013.01)

(58) Field of Classification Search
None
See application file for complete search history.

(56) References Cited

U.S. PATENT DOCUMENTS

| | | | |
|---|---|---|---|
| 7,574,491 B2 | 8/2009 | Stein et al. | |
| 7,665,071 B1 * | 2/2010 | Roles et al. | 717/130 |
| 8,375,142 B2 | 2/2013 | Ingle et al. | |
| 8,386,610 B2 | 2/2013 | Yahalom et al. | |
| 2006/0101402 A1 * | 5/2006 | Miller et al. | 717/124 |
| 2007/0006218 A1 * | 1/2007 | Vinberg et al. | 717/174 |
| 2008/0059625 A1 * | 3/2008 | Barnett et al. | 709/223 |
| 2009/0006069 A1 * | 1/2009 | Alam et al. | 703/22 |
| 2010/0005160 A1 * | 1/2010 | Sparks | 709/222 |
| 2010/0262558 A1 * | 10/2010 | Edwards et al. | 705/348 |
| 2012/0303923 A1 | 11/2012 | Behera et al. | |
| 2013/0036422 A1 | 2/2013 | Rao et al. | |

OTHER PUBLICATIONS

"Unified Fabric White Paper—Fibre Channel over Ethernet (FCoE)", Retrieved on: Apr. 26, 2013, Available at: http://www.cisco.com/en/US/docs/solutions/Enterprise/Data_Center/UF_FCoE_final.pdf.

(Continued)

*Primary Examiner* — Don Wong
*Assistant Examiner* — Reshaun M Finkley
(74) *Attorney, Agent, or Firm* — Ben Tabor; Dolan Stein; Micky Minhas

(57) ABSTRACT

Modeling an application deployed in a distributed system. The method includes accessing an infrastructure model of a distributed system. The infrastructure model includes a model of specific physical hardware including unique identifiers for each piece of hardware and an identification of interconnections of the physical hardware. The method further includes accessing an application model for an application. The application model defines the components that make up the application and how the components are to be deployed. The method further includes deploying the application in the distributed system by deploying elements of the application on hardware modeled in the infrastructure model. The method further includes using the infrastructure model and the application model deployment creating a deployment model defining how the application is deployed on the physical hardware.

20 Claims, 6 Drawing Sheets

(56) References Cited

OTHER PUBLICATIONS

"Voltaire Unified Fabric Manager Software Managing Scale-Out Ethernet Fabrics", Retrieved on: Apr. 26, 2013, Available at: http://www.voltaire.com/assets/files/Datasheets3/UFM-DS-Ethernet-web-012011.pdf.

"Brocade Data Center Fabric Manager: Unified Fabric Management in the Evolving Data Center", Retrieved on: Apr. 26, 2013, Available at: http://www.brocade.com/downloads/documents/technical_briefs/Brocade_DCFM_GA-FB-106-01.pdf.

"VMware vCenter Operations Management Suite", Published on: Oct. 12, 2012, Available at: http://www.vmware.com/products/datacenter-virtualization/vcenter-operations-management/how-it-works.html.

"Understanding Classes and Objects", Retrieved on: Apr. 29, 2013, Available at: http://technet.microsoft.com/en-us/library/hh457568.aspx.

Embley, Bob, "Seafloor Mapping", Published on: Mar. 17, 2004, Available at: http://oceanexplorer.noaa.gov/explorations/03fire/background/mapping/mapping.html.

"Velodyne", Published on: Oct. 23, 2011, Available at: http://velodynelidar.com/lidar/hdlproducts/hdl64e.aspx.

"Unmanned Aerial Vehicle", Retrieved on: Apr. 30, 2013, Available at: http://en.wikipedia.org/wiki/Unmanned_aerial_vehicle.

\* cited by examiner

UNIFIED DATACENTER STORAGE MODEL

CROSS-REFERENCE TO RELATED APPLICATIONS

This application claims the benefit of U.S. Provisional application 61/830,526 filed Jun. 3, 2013, titled "UNIFIED DATACENTER STORAGE MODEL", which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In a typical data center environment, administrators manage compute, storage, and networking resources in a complex configuration. Several factors contribute to the complexity administrators deal with including: size of the datacenter and the number of datacenters, physical location of datacenters, number of interconnected devices, number of workloads running in the environment, number of administrator groups that deal with all these devices, etc.

Layered on top of the fabric is an even more complex collection of workloads, each with a different purpose for its end-user, with no guarantee of consistency in how the workloads is configured, and more importantly, each one has a different expectation of the behavior of the underlying fabric. Some workloads do not care about which fabric they are deployed on as long as basic needs are met (such as sufficient storage space, connectivity to a network, and sufficient compute capacity). Other workloads require specific components to be available as part of the fabric or as a service that runs on the fabric (e.g. some workloads may require physical load balancers vs. software based load balancers). It can be difficult to create and maintain models of datacenters which include models of the fabric as well as models of workloads deployed on the fabric.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for modeling an application deployed in a distributed system. The method includes accessing an infrastructure model of a distributed system. The infrastructure model includes a model of specific physical hardware including unique identifiers for each piece of hardware and an identification of interconnections of the physical hardware. The method further includes accessing an application model for an application. The application model defines the components that make up the application and how the components are to be deployed. The method further includes deploying the application in the distributed system by deploying elements of the application on hardware modeled in the infrastructure model. The method further includes using the infrastructure model and the application model deployment creating a deployment model defining how the application is deployed on the physical hardware.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein include functionality for creating hardware and virtual component models for a datacenter fabric; and application models that can be applied to the hardware and virtual component models to understand how specific services implemented as part of an application are deployed on specific hardware, such as may be uniquely identified. This can facilitate management of applications, datacenters, the datacenter fabric, etc. In particular, such modeling can facilitate deployment of applications, hardware, and virtualization, migration of virtualization components and application components, troubleshooting hardware, virtualization components and applications, etc.

Figure 1:
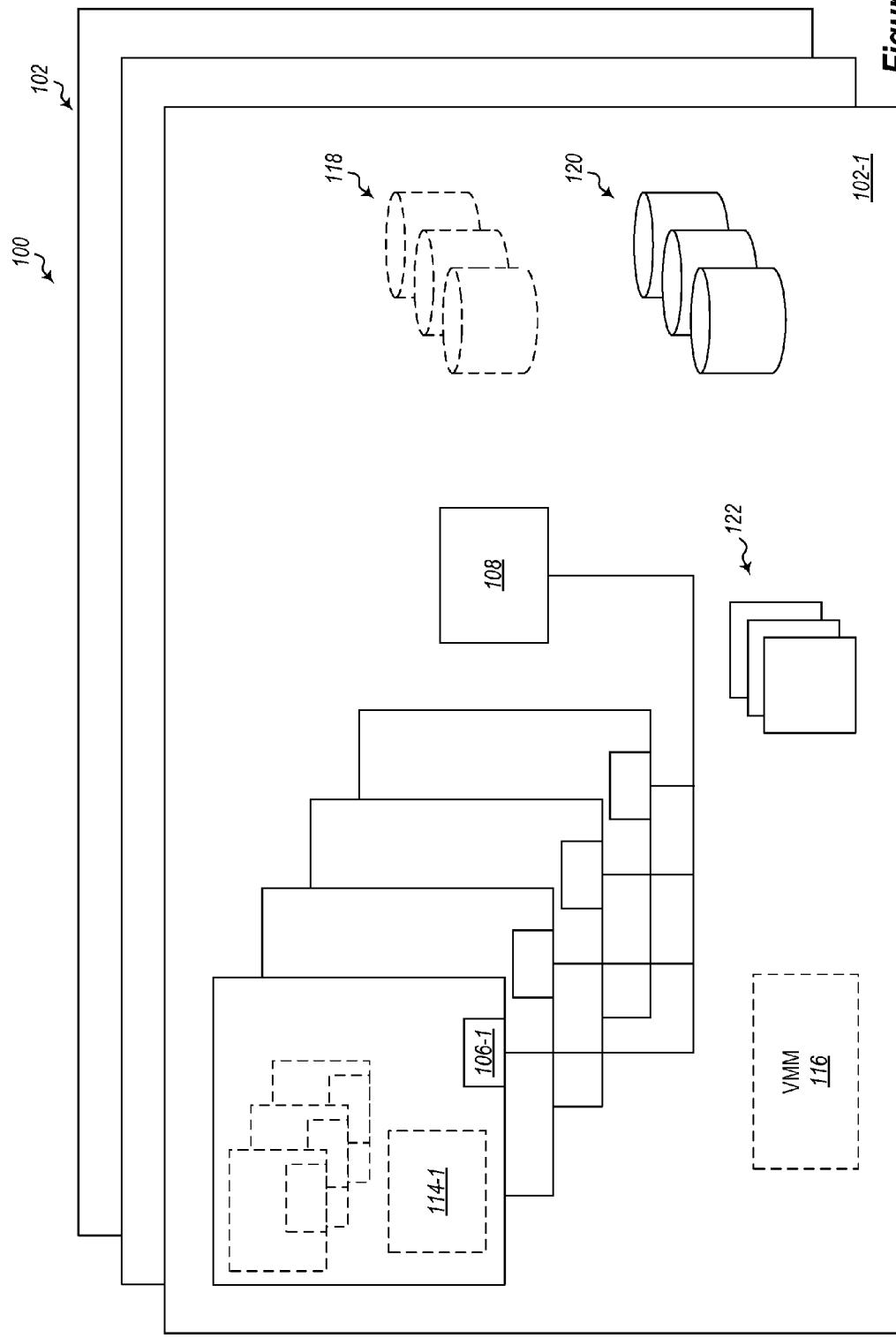
FIG. 1 illustrates a network fabric.

Referring now to FIG. 1, an example is illustrated. FIG. 1 illustrates a distributed network topology fabric 100. Within the distributed network topology fabric 100 is a set 102 of datacenters. While three datacenters are illustrated in the set 102, it should be appreciated that virtually any number of datacenters may be implemented within a distributed network topology. Further, the datacenters may be of similar or different types of datacenters. For example, in one embodiment, a single private datacenter under virtually complete control of an enterprise may be implemented. In another example, multiple private datacenters under virtually complete control of an enterprise may be implemented. In yet another example, a datacenter may be a public cloud datacenter under the control of a hosting entity, but which hosts tenants' virtual networks. In yet another alternative embodiment, an enterprise may use a combination of private cloud data center(s) and public cloud data center(s), etc.

FIG. 1 illustrates, for example, a datacenter 102-1. At the datacenter 102-1, is a combination of physical components and virtual components. In particular, FIG. 1 illustrates a set 104 of physical host machines. Each of the physical host machines includes a physical network interface card (nic), such as the nic 106-1 illustrated on the physical host machine 104-1. The nics are connected to a physical switch 108 that connects the physical host machines in the datacenter 102-1. The switch 108 can also connect the physical host machines to other datacenters or other hardware and/or devices external to the datacenter 102-1.

FIG. 1 further illustrates various virtual components implemented at the datacenter 102-1. For example, the physical host machine 104-1 hosts a set 110 of virtual machines. In the illustrated example, virtual machine 110-1 also includes a virtual network interface card (vnic) 112-1. Each of the virtual machines includes a vnic that facilitates communication to and from virtual machines. The virtual machines represent workloads as part of application services deployed to physical hardware.

FIG. 1 further illustrates a virtual switch 114-1. One or more virtual switches are deployed on each host to facilitate communication between virtual machines and communication external to a host. The virtual switches may be implemented using functionality of the physical switch 108.

FIG. 1 further illustrates a virtual machine management system (VMM) 116, which manages multiple hypervisors. The VMM 116 may be used to place and configure virtual components in the datacenter 102-1. The VMM 116 may be implemented using one or more of the physical host machines in the set 104 or other appropriate system hardware. Additionally, the physical switches may support functionality, and such functionality needs to be enabled if desired for use by a virtual components. Similarly, for vnics to support certain functionality, such functionality needs to be enabled by the underlying physical nics.

FIG. 1 further illustrates a set 118 of virtual disks. The virtual disks may be implemented using one or more physical disks, such as those in the set 120 of physical disks or storage on hosts, such as those in the set 104 of hosts.

FIG. 1 further illustrates a set 122 of providers. Each provider in the set 122 of providers identifies a standards based schema that represents a hardware device. The VMM 116 can query providers to determine characteristics and capabilities of hardware devices in a fabric based on a standards based description of the devices. These characteristics and capabilities can be used to construct an infrastructure model of the fabric. In particular, knowing what hardware devices are in a fabric and how they are connected, and querying providers, the VMM 116 can construct an infrastructure model of hardware in the fabric. Further, knowing how virtual components are deployed in the fabric as part of an application, the VMM 116 can construct a deployment model where an application model is applied to specific hardware.

Some embodiments herein allow an administrator to build up the portion of the model that accounts for storage deployed in the fabric and all the workloads that depend on that storage. The end to end mapping may include:

Association between virtualization hosts and fabric storage (virtual disks and file shares mapped to virtualization host);

Association between virtual machines (VMs) and virtual storage (VM and its virtual hard disks);

Association between virtual storage and the fabric storage it is deployed to (virtual hard disks and volumes or file shares);

Association between virtual machines and fabric storage directly exposed to it (virtual disks/shares mapped directly to VM);

Association between fabric network ports and storage fabric ports (fibre channel (FC) switch ports and storage device ports);

Association between fabric network ports and virtualization host ports (FC switch ports and server host bus adaptor (HBA) ports);

Association between fabric network ports and virtual machines ports (VMs with synthetic FC);

Detailed model of the fabric component internals (physical disk, pools, virtual disks, target ports, file servers, shares, etc.).

In a typical data center environment, administrators manage compute, storage, and networking resources in a complex configuration. Several factors contribute to the complexity administrators deal with: size of the datacenter and the number of datacenters, physical location of datacenters, number of interconnected devices, number of workloads running in the environment, number of administrator groups that deal with all these devices. This complex mesh of compute, storage, and networking devices is referred to herein as the "fabric". This term fabric is commonly used by customers to refer to the physical capacity that hosts their applications.

Models illustrated herein refer to the management model describing the objects that represent assets in the datacenter, including well defined associations between objects, properties of each object, and methods a management system can execute against these objects.

The success of an administrator managing a complex fabric starts with an accurate model of the fabric. Highly accurate models gives administrators the confidence in their decisions when expanding the fabric (adding capacity), contracting the fabric (decommissioning capacity), servicing the fabric (replacement of parts), upgrade of the fabric, deploying new workloads into the fabric, and balancing existing workloads in the fabric.

Administrators managing a complex fabric benefit from hyper accurate models of all interconnected devices. However, the picture is not complete without visibility into workloads. Layered on top of the fabric is an even more complex collection of workloads (as represented by the virtual machines), each with a different purpose for its end-user, with no guarantee of consistency in how the workloads are configured, and more importantly, each one has a different expectation of the behavior of the underlying fabric. Some workloads do not care about which fabric they are deployed on as long as basic needs are met—sufficient storage space, connectivity to a network, and sufficient computer capacity. Other workloads require specific components to be available as part of the fabric or as a service that runs on the fabric (e.g. physical load balancers vs. software based load balancers). The most complete model of the fabric accounts for the workloads deployed on it and how the workloads interact with each other and the fabric.

Fabric components are typically static assets, while workloads can move with a higher degree of flexibility. This is especially true of virtualized workloads since they have no affinity to any physical computer (aside from processor technology).

Embodiments may model components by using standards based component models discoverable by querying providers, such as the providers in the set 122 of providers. For example, various standards bodies may define various protocols, interfaces, etc. for physical hardware. When a new physical component is added to the fabric, a provider can be registered with the VMM 116 where the provider identifies a standards based schema that represents a hardware device. In this way, actually functionality of a device, as defined by well-known standards, can be discovered for inclusion in an infrastructure model. By using standards, administrators gain the benefit of a well-known and well defined model that can help them manage various fabrics. Components in the fabric can be modeled by modeling their interconnections with other components, as well as their functionality as discovered by querying a corresponding provider for the component.

The model used to define the fabric leverages years of collective management experience in the industry by adopting standards based models for managed devices across storage, networking, and compute.

For a management system to generate the model, the model has the ability to collect information from different sources and the knowledge of how to build the correct association between all the objects. Once this model is built and guaranteed to be up to date (e.g. using indications/events from the underlying physical devices), other components of the management system can import the model and build intelligence around the model.

Figure 2:
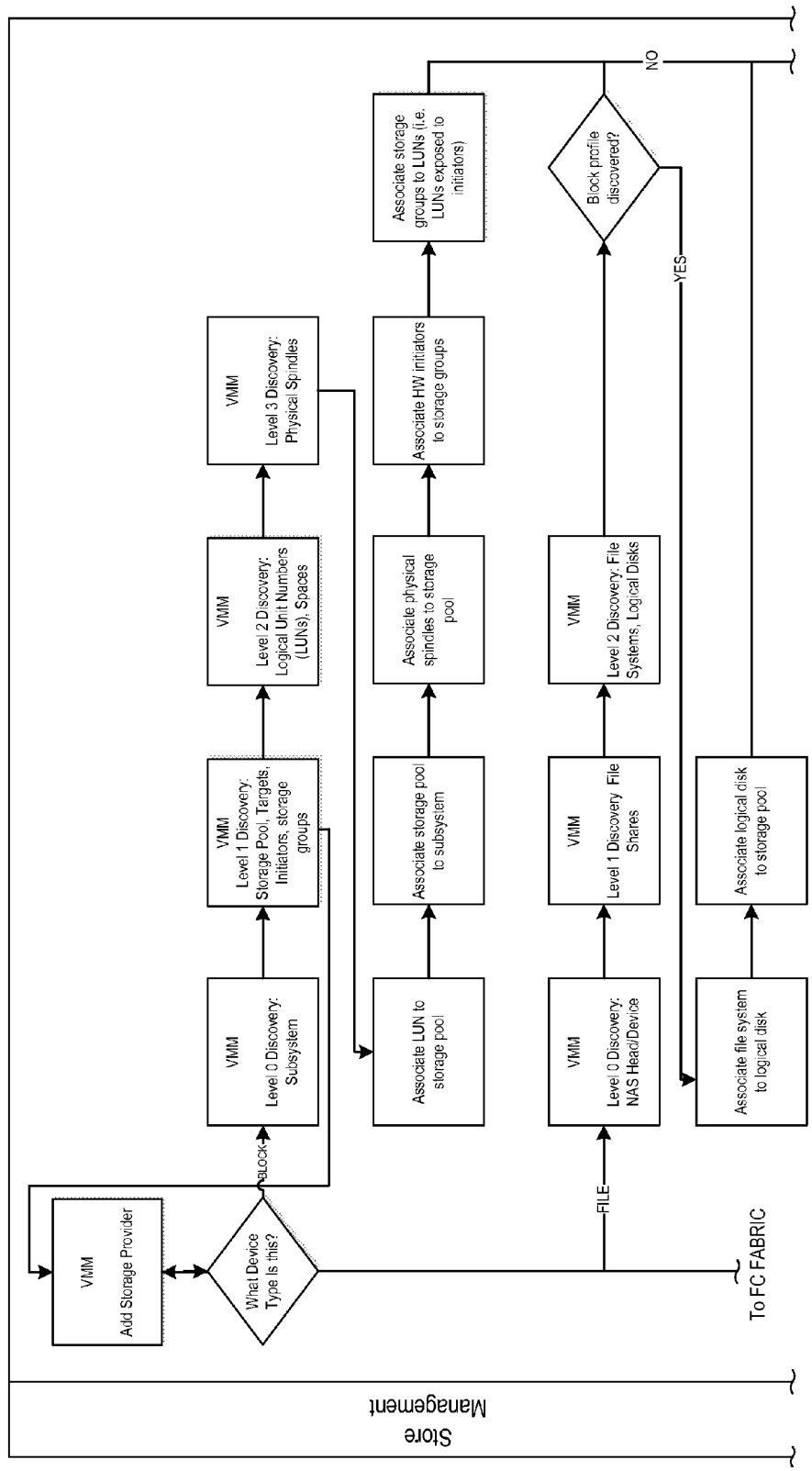
FIG. 2 illustrates an example flow-chart illustrating one example of mapping a deployment model.
Figure 2:
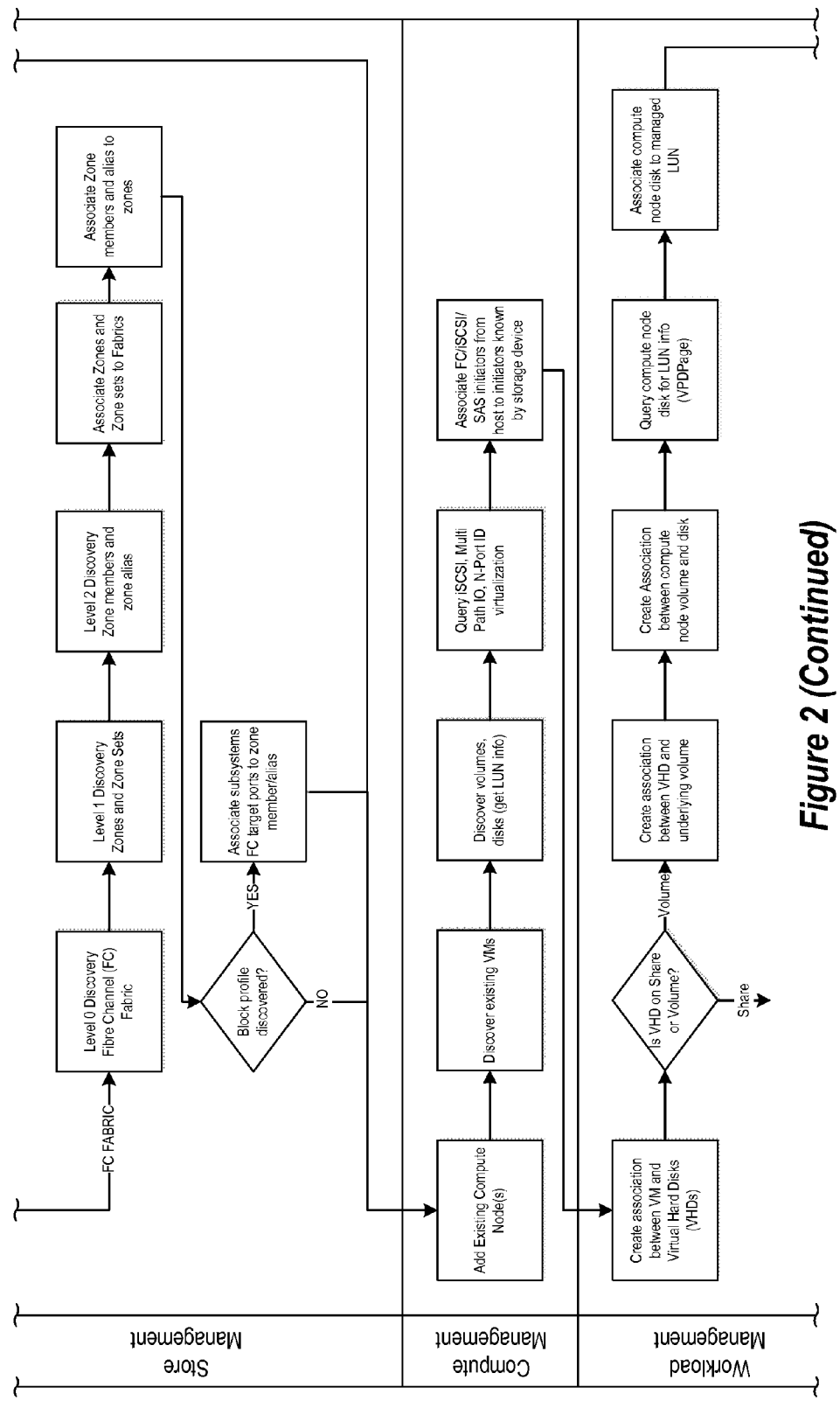
Figure 2:
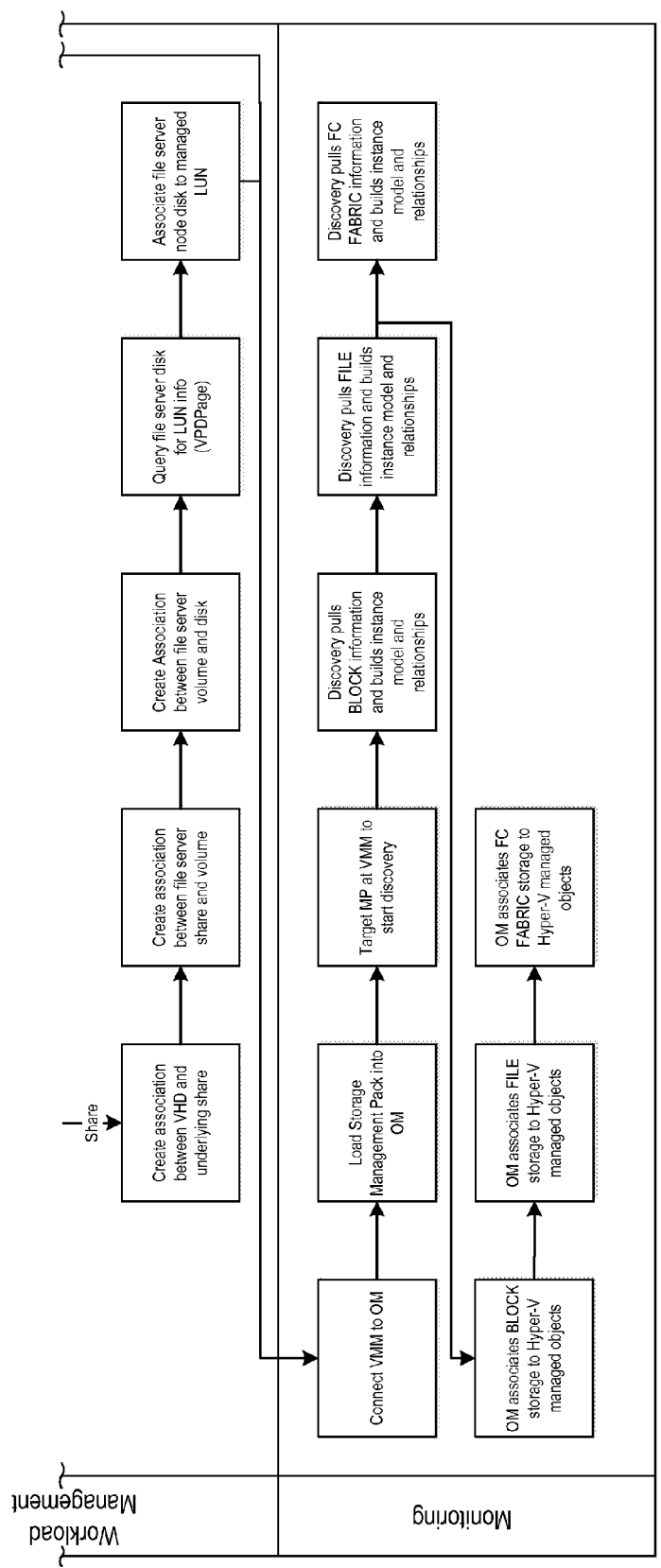

Illustratively, FIG. 2 illustrates a flow chart illustrating on example of how hardware devices are discovered and how virtual components are mapped to the hardware devices.

Figure 3:
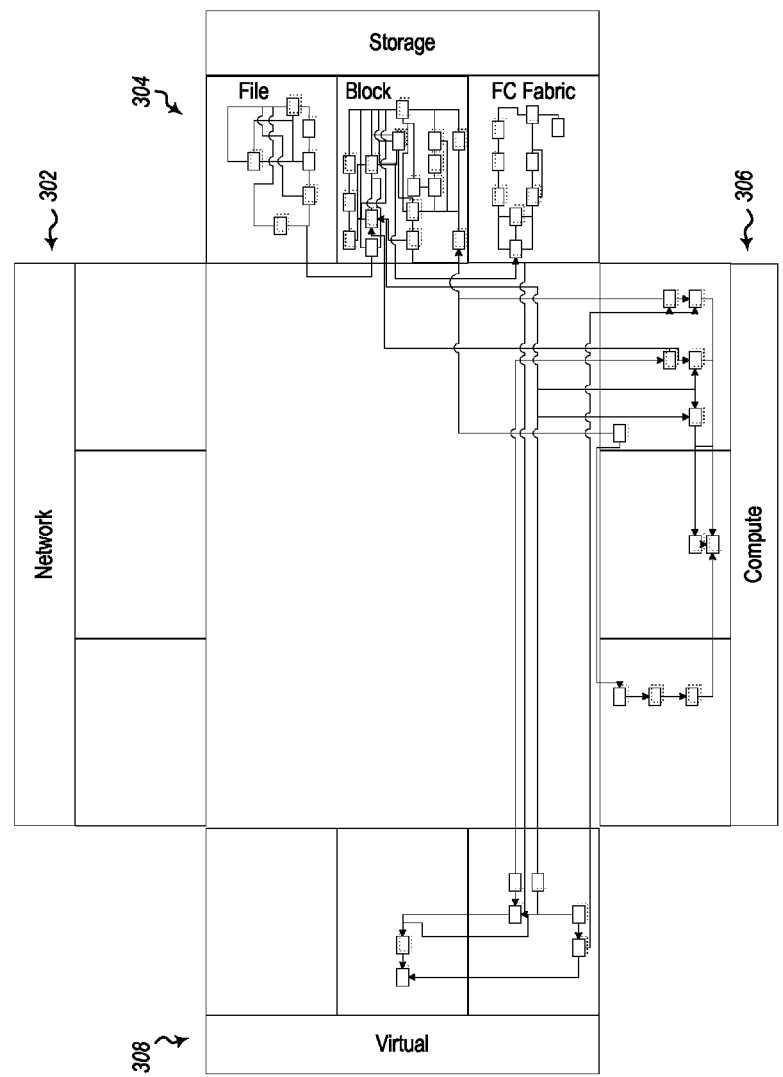
FIG. 3 illustrates a deployment model where an application model is applied to an infrastructure model.

Referring now to FIG. 3, an example, of a deployment model 300 is illustrated. The deployment model 300 includes an infrastructure model including physical modeling of network resources 302, storage resources 304 and compute resources 306 in a fabric along with an application model, illustrated by the virtual resources 208 applied to the infrastructure model.

As noted, embodiments may implement monitoring. In particular, a well defined and fully connected model from an authoritative source is the baseline for a robust monitoring solution. Monitoring need only focus on advanced monitoring scenarios and not on building a model and figuring out ways to collect the data to build the model Embodiments may facilitate chargeback and capacity management. In particular, with a model in place, one can assign consumption values and discover consumption rates that apply to different parts of the model.

Embodiments may facilitate automation and orchestration. A standards based approach helps drive a model that can easily benefit from advanced automation and end to end orchestration. There is no need to special case workflows based on the particular device. This is a benefit for partners as well. Administrators can leverage the benefits of the device out of the box without further needs to integrate or proprietary consoles that do not have the complete model in place.

Embodiments may facilitate disaster recovery, backup, and recovery. Tools that need to have rich information about the application to provide value-add services like back and disaster recovery benefit from a fully connected model. The services can determine the scope of impact of a particular policy and ensure the correct actions execute for the workload, ideally without requiring an administrator to manage each workloads individually.

Embodiments may facilitate extending visibility into partner management. With a full connected model, partners can walk thru the model and discover how their devices are related to workloads and if needed, import that model (or some of it) in their admin tools.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
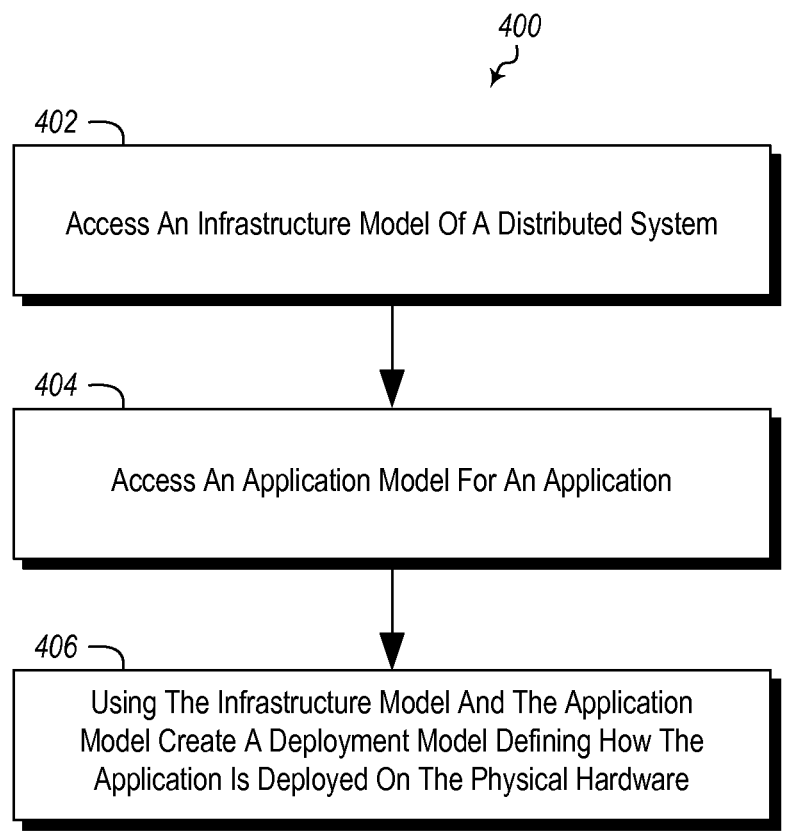
FIG. 4 illustrates a method of modeling an application deployed in a distributed system.

Referring now to FIG. 4, a method 400 is illustrated. The method 400 may be practiced in a computing environment and includes acts for modeling an application deployed in a distributed system. The method includes accessing an infrastructure model of a distributed system (act 402). The infrastructure model includes a model of specific physical hardware including unique identifiers for each piece of actual existing hardware and an identification of interconnections of the physical hardware. For example, FIG. 3 illustrates how network, compute and storage resources are interconnected. Specific pieces of hardware can be identified by their serial number, MAC addresses, or other identifiers used to identify a specific piece of hardware.

The method 400 further includes accessing an application model for an application. The application model defines the components that make up the application and how the components are to be deployed (act 404). For example, FIG. 3 illustrates virtual components such as virtual machines and virtual workloads that make up the application model.

The method 400 further includes using the infrastructure model and the application model creating a deployment model defining how the application is deployed on the physical hardware (act 406). For example, FIG. 4 illustrates the deployment model.

The method 400 may further include deploying the application in the distributed system by deploying elements of the application on hardware modeled in the infrastructure model, including deploying virtual machines to hardware, connecting the virtual machines to a hypervisor, deploy operating systems on the virtual machines, configuring the operating systems on the virtual machines, and deploying payloads to the virtual machines.

The method may further include identifying that new hardware has been added to the distributed system, and as a result updating the infrastructure model. For example, changes in hardware can be discovered and the infrastructure model can be updated to show the additional hardware. This may be done by querying providers for the hardware and documenting interconnections with existing hardware.

The method 400 may further include changing the deployment of the application in the distributed system and as a result updating the deployment model. For example, VM workloads may be migrated to different host machines. This migration can be used to update the deployment model showing how application services are deployed on hardware infrastructure.

The 400 may further include changing the application and as a result changing the infrastructure and deployment models. In particular, changes to the application may result in both changes to the infrastructure model as components are changed in the fabric and changes to the deployment model.

The method 400 may further include creating the infrastructure model by querying providers for hardware devices wherein the providers can identify a one or more standards based schemas that represents the device. For example, FIG. 2 illustrates a set 122 of providers that can be queried regarding system hardware.

The method 400 may further include identifying changes in the hardware and providing an alert. For example, hardware failures or upgrades may be identified and as a result an alert may be provided to a system administrator that allows the system administrator to address hardware issues.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of modeling an application deployed in a distributed system, the method comprising:

accessing an infrastructure model of a distributed system, wherein the infrastructure model comprises a model of specific physical hardware including unique identifiers for each piece of actual existing hardware and an identification of interconnections of the physical hardware;

accessing an application model for an application, the application model defining the components that make up the application and how the components are to be deployed within a specified distributed system, the application model further providing an indication of workloads currently deployed on the specified distributed system and how those workloads interact with each other and with the specified distributed system; and using the infrastructure model and the application model, creating a deployment model that specifies how the application is to be deployed on the physical hardware, the deployment model identifying hardware components included in the infrastructure model and further identifying application components included in the application model.

2. The method of claim 1, further comprising deploying the application in the distributed system by deploying elements of the application on hardware modeled in the infrastructure model, including deploying virtual machines to hardware, connecting the virtual machines to a hypervisor, deploy operating systems on the virtual machines, configuring the operating systems on the virtual machines, and deploying payloads to the virtual machines.

3. The method of claim 1, further comprising identifying that new hardware has been added to the distributed system, and as a result updating the infrastructure model.

4. The method of claim 1, further comprising changing the deployment of the application in the distributed system and as a result updating the deployment model.

5. The method of claim 1, further comprising changing the application and as a result changing the infrastructure and deployment models.

6. The method of claim 1, further comprising creating the infrastructure model by querying providers for hardware devices wherein the providers can identify a one or more standards based schemas that represents the device.

7. The method of claim 1, further comprising identifying changes in the hardware and providing an alert.

8. In a computing environment, a physical computer readable storage device comprising computer executable instructions that when executed by one or more processors causes the following to be performed:

accessing an infrastructure model of a distributed system, wherein the infrastructure model comprises a model of specific physical hardware including unique identifiers for each piece of actual existing hardware and an identification of interconnections of the physical hardware;

accessing an application model for an application, the application model defining the components that make up the application and how the components are to be deployed within a specified distributed system, the application model further providing an indication of workloads currently deployed on the specified distributed system and how those workloads interact with each other and with the specified distributed system; and using the infrastructure model and the application model, creating a deployment model that specifies how the application is to be deployed on the physical hardware, the deployment model identifying hardware components included in the infrastructure model and further identifying application components included in the application model.

9. The physical computer readable storage device of claim 8, further comprising deploying the application in the distributed system by deploying elements of the application on hardware modeled in the infrastructure model, including deploying virtual machines to hardware, connecting the virtual machines to a hypervisor, deploy operating systems on the virtual machines, configuring the operating systems on the virtual machines, and deploying payloads to the virtual machines.

10. The physical computer readable storage device of claim 8, further comprising identifying that new hardware has been added to the distributed system, and as a result updating the infrastructure model.

11. The physical computer readable storage device of claim 8, further comprising changing the deployment of the application in the distributed system and as a result updating the deployment model.

12. The physical computer readable storage device of claim 8, further comprising changing the application and as a result changing the infrastructure and deployment models.

13. The physical computer readable storage device of claim 8, further comprising creating the infrastructure model by querying providers for hardware devices wherein the providers can identify a one or more standards based schemas that represents the device.

14. The physical computer readable storage device of claim 8, further comprising identifying changes in the hardware and providing an alert.

15. In a computing environment, a system for modeling an application deployed in a distributed system, the system comprising:

one or more processors; and one or more computer readable media, wherein the one or more computer readable media comprise computer executable instructions that when executed by at least one of the one or more processors cause the system to perform the following:

generating an infrastructure model of a distributed system by querying providers that characterize hardware using standards based schema to identify characteristics of specific hardware in the distributed system and by modeling interconnections of hardware in the distributed system;

generating an application model for an application, the application model defining the components that make up the application and how the components are to be deployed within a specified distributed system, the application model further providing an indication of workloads currently deployed on the specified distributed system and how those workloads interact with each other and with the specified distributed system; and using the infrastructure model and the application model, identifying how services of the application are deployed on hardware in the distributed system to create a deployment model that specifies how the application is to be deployed on the physical hardware, the deployment model identifying hardware components included in the infrastructure model and further identifying application components included in the application model.

16. The system of claim 15, further comprising deploying the application in the distributed system by deploying elements of the application on hardware modeled in the infrastructure model, including deploying virtual machines to hardware, connecting the virtual machines to a hypervisor, deploy operating systems on the virtual machines, configuring the operating systems on the virtual machines, and deploying payloads to the virtual machines.

17. The system of claim 15, further comprising identifying that new hardware has been added to the distributed system, and as a result updating the infrastructure model.

18. The system of claim 15, further comprising changing the deployment of the application in the distributed system and as a result updating the deployment model.

19. The system of claim 15, further comprising changing the application and as a result changing the infrastructure and deployment models.

20. The system of claim 15, further comprising identifying changes in the hardware and providing an alert.

\* \* \* \* \*